US012432081B2

(12) United States Patent
Bradley et al.

(10) Patent No.: US 12,432,081 B2
(45) Date of Patent: Sep. 30, 2025

(54) DIGITAL ASSISTANT FOR DETECTING OFF-TOPIC USERS IN NETWORK-BASED GROUP COMMUNICATION SESSIONS

(71) Applicant: AT&T Intellectual Property I, L.P., Atlanta, GA (US)

(72) Inventors: Nigel Bradley, Canton, GA (US); Rashmi Palamadai, Naperville, IL (US); Abdulkadir Hagi, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/398,117

(22) Filed: Dec. 27, 2023

(65) Prior Publication Data

US 2025/0219858 A1     Jul. 3, 2025

(51) Int. Cl.
*G06F 15/16*     (2006.01)
*G10L 15/183*     (2013.01)
*G10L 25/63*     (2013.01)
*H04L 12/18*     (2006.01)

(52) U.S. Cl.
CPC ........ *H04L 12/1822* (2013.01); *G10L 15/183* (2013.01); *G10L 25/63* (2013.01); *H04L 12/1895* (2013.01)

(58) Field of Classification Search
CPC ............. H04L 12/1822; H04L 12/1895; G10L 15/183; G10L 25/63
See application file for complete search history.

(56) References Cited

U.S. PATENT DOCUMENTS

| | | | |
|---|---|---|---|
| 2015/0194147 A1* | 7/2015 | Yoon | G09B 19/06 704/236 |
| 2021/0058436 A1* | 2/2021 | Mombourquette | H04L 65/1083 |
| 2022/0214859 A1* | 7/2022 | El Ghazzal | H03G 3/34 |

* cited by examiner

*Primary Examiner* — Padma Mundur (57) ABSTRACT

Method, computer-readable media, and apparatuses for applying at least one remedial action within a communication session via at least one network in response to detecting via at least one detection model that the audio content of a first user is off-topic are described. For example, a processing system including at least one processor may establish a communication session between at least a first communication system of a first user and a plurality of communication systems of a plurality of additional users via at least one network. The processing system may then determine at least one topic for the communication session, detect, via at least one topic detection model, an audio content of the first user that is off-topic, and apply at least one remedial action within the communication session in response to the detecting that the audio content of the first user is off-topic.

20 Claims, 4 Drawing Sheets

DIGITAL ASSISTANT FOR DETECTING OFF-TOPIC USERS IN NETWORK-BASED GROUP COMMUNICATION SESSIONS

The present disclosure relates generally to voice-based group communication sessions, such as audio conferences, video conferences, or the like, and more particularly to methods, non-transitory computer-readable media, and apparatuses for applying at least one remedial action within a communication session via at least one network in response to detecting via at least one detection model that the audio content of a first user is off-topic.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, non-transitory computer-readable medium, and apparatus for applying at least one remedial action within a communication session via at least one network in response to detecting via at least one detection model that the audio content of a first user is off-topic. For instance, in one example, a processing system including at least one processor may establish a communication session between at least a first communication system of a first user and a plurality of communication systems of a plurality of additional users via at least one network. The processing system may then determine at least one topic for the communication session, detect, via at least one topic detection model, an audio content of the first user that is off-topic, and apply at least one remedial action within the communication session in response to the detecting that the audio content of the first user is off-topic.

In particular, examples of the present disclosure utilize real-time network-hosted artificial intelligence (AI)/machine learning (ML) to determine the purpose of a multi-party/group communication session (e.g., an online meeting, a teleconference, or the like) and may monitor when live discussions go off-topic for the purpose of guiding conversations, muting participants when warranted, and/or other remedial actions. By detecting circumstances of when to warn and/or mute users, such users can be spared of potentially embarrassing scenarios. For example, an online meeting participant may respond to a family member asking "what's for dinner?," while connected to the meeting. However, in one example, the present disclosure may process the audio content (and in one example additional/auxiliary data, such as video) to automatically determine that this is an off-topic discussion. For instance, the stated topic of a meeting may be identified, or the topic may be determined to be something other than the stated topic/purpose of the online meeting. Tonality of the participant's voice or other non-semantic audio features may be further indicative that the participant is off-topic, where the audio features may comprise inputs to an AI/ML module that may determine, based at least in part upon such features, that at least one of the participants is off-topic. In one example, when the participant is determined to be off-topic, the participant may be muted automatically and/or involuntarily. Alternatively, or in addition, the present disclosure may comprise or may utilize a user interface to notify a participant of when the participant has been muted. In one example, the AI/ML module may identify how far off-topic the participant is determined to be, e.g., a degree that the audio content of the participant is off-topic. In addition, in such an example, the notification may indicate the degree that the audio content of the participant is off-topic. In one example, the notification may include a visualization, such as a dial/meter that indicates the degree that the audio content of the participant is off-topic (e.g., slightly off-topic, mostly off-topic, highly off-topic, or the like).

Notably, virtual experiences, teleconferences, online meetings, and the like are growing as the norm for workplace collaboration, education, and various forms of entertainment. Examples of the present disclosure extend network-based conference technologies to include or exclude audio based on contextual relevance to topics, events, attendees, and discussions. For instance, examples of the present disclosure may comprise a network-managed AI/ML module that determines contextual relevance associated with the purpose of the activity. To illustrate, an AI/ML module of the present disclosure may pull relevant context information from an environment, comprising at least audio content of a network-based group communication session, to identify the type of scenario and/or purpose of the group communication sessions.

In one example, the present disclosure may include a user interface to inform/communicate with a user/participant regarding sound quality, mute status, automated muting and unmuting actions, live topic relevance, and so forth. In one example, the present disclosure may integrate with one or more devices of each participant for most effective communication. For example, a group communication session server (e.g., a teleconference service, an online meeting platform, or the like) may pull in appropriate network resources according to the characteristics of the session, and may update the utilized network resources dynamically as such resources become available and/or as characteristics of the session change. Similarly, the group communication session server may monitor user/participant device locations, the type(s) of available devices/hardware, supported input-output technologies, and so forth, and may attempt to optimize the delivery and/or upload of communication session content for each of the participants. In one example, the present disclosure may select from among an ecosystem of devices for a participant and for a given communication session such that the participant is best served for professional, social, educational, performance, or entertainment type engagements, respectively (or the like). In addition, in one example, the present disclosure may learn when it is appropriate to communicate specific types of status to specific participants, e.g., professional versus casual communication sessions, or the like. For instance, the present disclosure may select from among multiple communication modalities to communicate discretely with one or more participants regarding when the participants are off-topic, when the participants have been automatically muted or unmuted, and so forth. These and other aspects of the present disclosure are described in greater detail below in connection with the examples of FIGS. 1-4.

Figure 1:
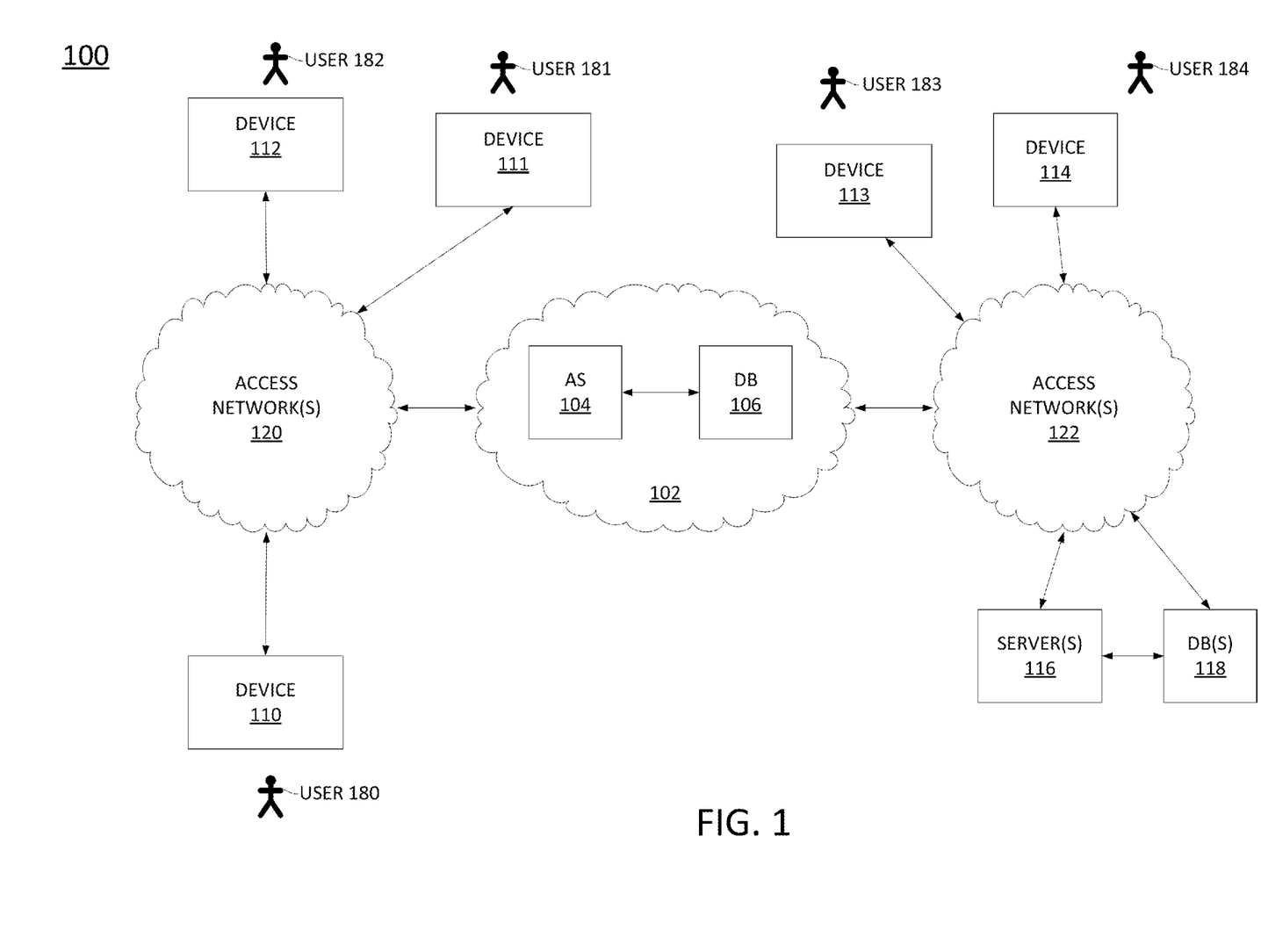
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a communication network service provider (e.g., a telecommunication network). The network 102 may be in communication with one or more access networks 120 and 122, and the Internet (not shown). In one example, network 102 may combine core network components of a cellular network with components of a triple play service network; where triple-play services include telephone services, Internet services, and video services to subscribers or other users. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast video network, e.g., a cable television provider network or an Internet Protocol Television (IPTV) network, as well as an Internet Service Provider (ISP) network. In one example, network 102 may include a plurality of video or television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a communication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices.

In one example, the access networks 120 may be in communication with one or more devices 110-112. Similarly, access networks 122 may be in communication with one or more devices, e.g., devices 113 and 114, server(s) 116, databases (DBs) 118, and so forth. Access networks 120 and 122 may transmit and receive communications between devices 110-114, server(s) 116 and/or database (DB) 118, application server (AS) 104 and/or database (DB) 106, other components of network 102, devices reachable via the Internet in general, and so forth.

In one example, each of the devices 110-114 may comprise any single device or combination of devices that may comprise a user endpoint device. For example, the devices 110-114 may each comprise a mobile computing device, e.g., a cellular smart phone, a laptop, a tablet computer, a wearable computing device (e.g., a smart watch, a smart pair of eyeglasses, etc.), an augmented reality (AR) or virtual reality (VR) endpoint device, a desktop computer, an application server, a bank or cluster of such devices, and the like. In one example each of devices 110-114 may include a microphone and speaker, and may further include a display, a touch screen and/or keyboard, and so forth. In accordance with the present disclosure, each of the devices 110-114 may comprise a computing system or server, such as computing system 400 depicted in FIG. 4, and may be configured to perform operations or functions in connection with examples of the present disclosure for applying at least one remedial action within a communication session via at least one network in response to detecting via at least one detection model that the audio content of a first user is off-topic (such as illustrated and described in connection with the example method 300 of FIG. 3). For instance, devices 110-114 may establish communication with server(s) 116 and/or application server 104 to participate in a network-based group communication session. In one example, any of devices 110-114 may include an application (app) that is associated with network-based group communication sessions (e.g., a video conference application, an audio only conference application, a web browser, a browser plug-in, an add-on for VoIP and/or cellular telephony services, and so forth). In one example, such an app may comprise or may include a virtual assistant that may alert respective users 180-184 of off-topic audio content, which may be determined by the app on the respective one of the devices 110-114 or which may be determined by a conference server (e.g., server(s) 116) or another network-based entity participating in the group communication session/conference (e.g., an external virtual assistant as described in greater detail below).

In one example, the access networks 122 may also be in communication with server(s) 116 and DB(s) 118. In accordance with the present disclosure, each of the server(s) 116 may comprise a computing system or server, such as computing system 400 depicted in FIG. 4, and may individually or collectively be configured to perform operations or functions for applying at least one remedial action within a communication session via at least one network in response to detecting via at least one detection model that the audio content of a first user is off-topic (such as illustrated and described in connection with the example method 300 of FIG. 3). For instance, server(s) 116 may host and may represent one or more conference platforms/services, or the like. For instance, devices 110-114 may communicate with each other and/or with server(s) 116 to establish, maintain/operate, and/or tear-down a network-based group communication session. To illustrate, server(s) 116 may receive uplink content streams from participant devices (e.g., devices 110-114 of users 180-184) (e.g., comprising at least audio, and in some cases including video, augmented reality (AR) and/or virtual reality (VR) imagery, screen share uploads, files, or other media), and may distribute downlink conference content to various participants in an online conference. Server(s) 116 may also maintain user accounts and perform device and/or user authentication and authorization, may provide different levels of access to different participants based on user profiles/accounts, permissions set by conference hosts/organizers, etc. It should be noted that the functions of server(s) 116 may vary among online conference platforms. For instance, in another example, an online conference platform may be configured such that video and audio streams are sent device-to-device, e.g., without uploading to server(s) 116 and redistributing to participants.

In one example, server(s) 116 may comprise a virtual assistant that may operate as a participant in an online group communication session/conference. For instance, server(s) 116 may comprise a conference server that also instantiates a virtual participant. Alternatively, or in addition, one or more of server(s) 116 may represent a conference server, while another one or more of server(s) 116 may represent an independent virtual assistant service that may be added as a participant in a group communication session/conference. In one example, the present disclosure may operate as an add-on/overlay to a conference system, and online community, etc. In one example, the present disclosure may passively observe the communications. Alternatively, or in addition, the present disclosure may operate as an active gateway for any user submissions. In one example, the virtual assistant/virtual assistant service may be provided with host/administrator/organizer privileges, such as the ability to request that the hosting server(s) 116 mute and unmute different participants based on one or more criteria, to privately message different participants (e.g., any of users 180-184 at devices 110-114, respectively), and so forth.

Figure 4:
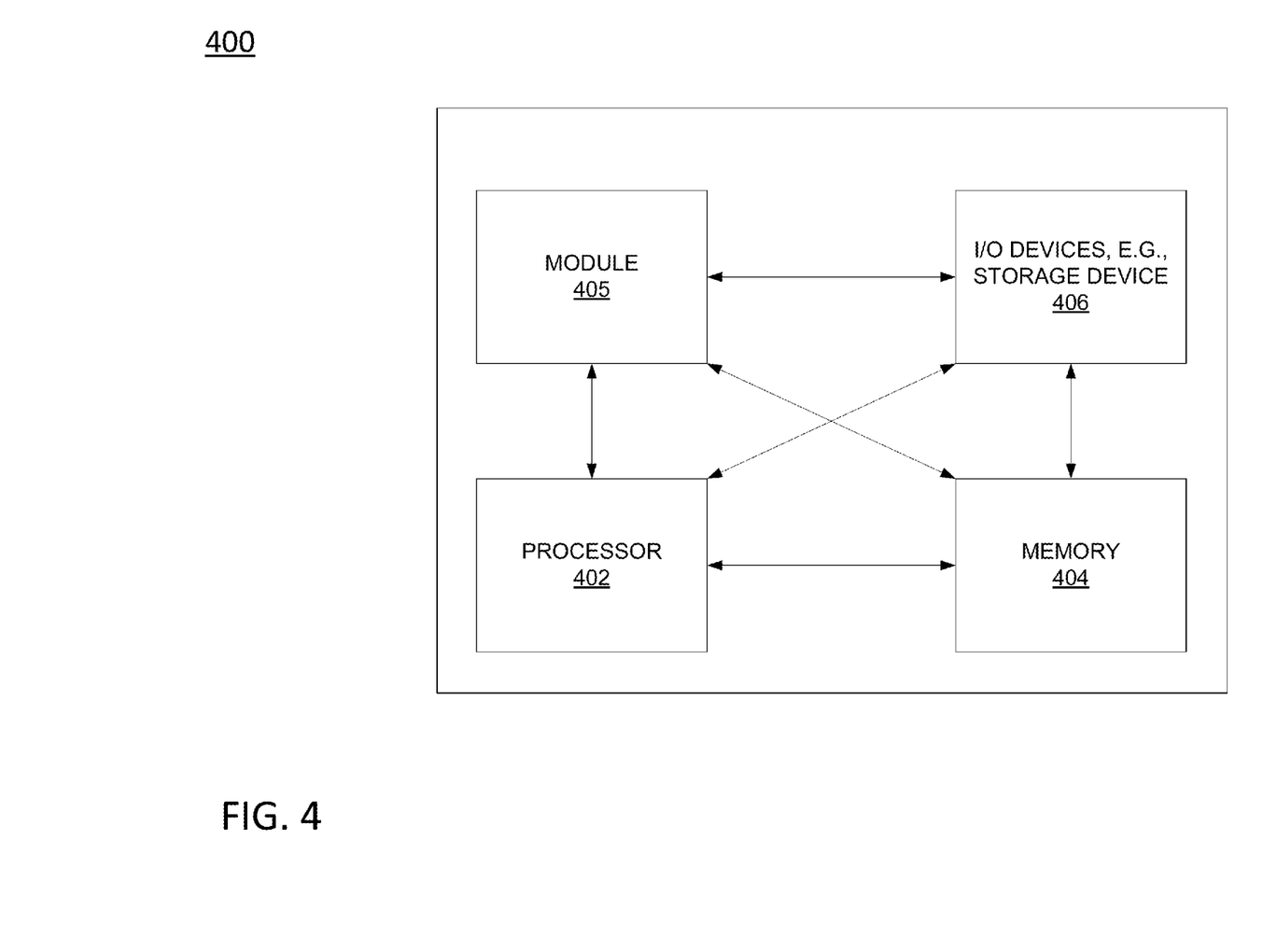
FIG. 4 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, DB(s) 118 may comprise one or more physical storage devices integrated with server(s) 116 (e.g., a database server), attached or coupled to the server(s) 116, or remotely accessible to server(s) 116 to store various types of information in support of systems for applying at least one remedial action within a communication session via at least one network in response to detecting via at least one detection model that the audio content of a first user is off-topic, in accordance with the present disclosure. For example, DB(s) 118 may include a user profile database that may store records (e.g., user profiles) for one or more participants (e.g., users 180-184) participating in a group communication session. It should be noted that, not all users who participate in group communication sessions may desire to use an off-topic alerting service. However, for those participating users, each user profile may include user contacts (e.g., a contact list) and/or a user's relationships with such contacts (e.g., colleague, supervisor, client, vendor, teacher, student, family member, and so forth). In one example, user profiles may also include user preferences for off-topic alerting (e.g., a degree or degrees of being off-topic which may result in user alerting or other remedial actions, or a degree or degrees of being off-topic which may result in user alerting or other remedial actions for different contexts (e.g., work, educational, leisure, etc.)). In one example, the user profiles may also include user preferences for different remedial actions that may be deployed when off-topic audio content is detected, such as selective muting, alerting, as well as the method(s) of alerting, and so forth. In one example, the user profiles may further include user preferences for selective muting and unmuting for other detected contexts, such as when a user is directly addressed, when a user is perceived to have finished answering a question or speaking, when collective group audio is expected (e.g., laughter in response to a presenter joke, such as for an online conference-based comedy or entertainment event), and so forth.

In one example, DB(s) 118 may store one or more topic detection models (e.g., machine learning models (MLMs)) for detecting topics in network-based group communication sessions. Depending upon the type communication session and the permitted content types (e.g., audio only, video (with audio), AR/VR, multimedia, etc.), the topic detection models may have different predictors/inputs. For instance, in one example, the topic detection models may be trained for and deployed to detect various topics in audio and/or text. In one example, the topic detection models may further be trained for and may utilize images/video or other data as auxiliary inputs/predictors.

In one example, the topic detection model(s) may comprise one or more machine learning algorithms (MLAs) and/or trained MLAs, e.g., MLMs. It should be noted that as referred to herein, a machine learning model (MLM) (or machine learning-based model) may comprise a machine learning algorithm (MLA) that has been "trained" or configured in accordance with input training data to perform a particular service (e.g., prediction, detection, classification, etc.). For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented as topic detection models in examples of the present disclosure.

In one example, a topic may comprise a "concept" from a lexical database. For example, the Large Scale Theme Ontology for Multimedia (LSCOM) has hundreds of "themes," such as: "parade," "exiting car," "handshaking," "running," "rocket launching," "barn," "college," "castle," "conference room," "emergency room," "bathroom," "interview on location," "text on artificial background," "ship," "shipyard," "birds," "face," "bicycle," and so on. Other examples include LSCOM-Lite, which has 39 themes, National Institute of Standards and Technology (NIST) Text REtrieval Conference (TREC) Video Retrieval Evaluation (TRECVID) 2016 lexical themes, and the like. In one example, the present disclosure may utilize a lexicon that is specific to a subject area to determine various topics present in content sources. For instance, a first lexicon may be used for topics related to the broad theme of "sports," a second lexicon may be used for topics related to the broad theme of "cars/vehicles," a third lexicon may be utilized for the broad theme of "politics," and so forth. Thus, the present disclosure may function with any lexicon that is presently available or that is later developed. In one example, the lexicon(s) may include topic models, or topic detection models (e.g., classifiers) for a number of topics which may be applied to network-based group communication sessions (e.g., audio and/or video content thereof) to identify topics therein.

Notably, classifiers can be trained from any audio, text, and/or other types of content to recognize various topics, which may include "stock price," "holiday sales," "audit," "math," "physics," "baseball," "medieval literature," "trip itinerary," etc. Topic identification classifiers may include support vector machine (SVM) based or non-SVM based classifiers, such as neural network based classifiers. The classifiers may be trained upon and utilize various data points to recognize topics or other semantic content in text or audio. For instance, classifiers may utilize speech recognition/audio-to-text pre-processing to obtain a text transcript and to rely upon various keywords or phrases as data points, may utilize text recognition pre-processing to identify keywords or phrases in captioned text as data points, may extract and use audio features from one or more representative audio samples, such as low-level audio features, including: spectral centroid, spectral roll-off, signal energy, mel-frequency cepstrum coefficients (MFCCs), linear predictor coefficients (LPC), line spectral frequency (LSF) coefficients, loudness coefficients, sharpness of loudness coefficients, spread of loudness coefficients, octave band signal intensities, and so forth, wherein the output of the model in response to a given input set of audio features is a prediction of whether a particular semantic content is or is not present (e.g., sounds indicative of a particular demeanor (e.g., "excited," "stressed," "content," "indifferent," etc.), the sound of a blender, a microwave, running water, a flushing toilet, another person speaking to a participant in the background, road traffic, etc. For instance, in one example, each audio model may comprise a feature vector representative of a particular sound, or a sequence of sounds.

Similarly, classifier models may use low-level invariant image data, such as colors, shapes, color moments, color histograms, edge distribution histograms, etc., or may utilize image salience to detect demeanors/emotional states from facial images. For instance, such detection models may include eigenfaces representing various dispositions or other moods, mental states, and/or emotional states, or similar SIFT or SURF models. For instance, a quantized vector, or a set of quantized vectors representing a demeanor, or other moods, mental states, and/or emotional states in facial images may be encoded using techniques such as principal component analysis (PCA), partial least squares (PLS), sparse coding, vector quantization (VQ), deep neural network encoding, and so forth. Thus, in one example, AS 104 may employ a feature matching detection. For instance, in one example, AS 104 may obtain new content and may calculate the Euclidean distance, Mahalanobis distance measure, or the like between a quantized vector of the facial image or audio data in the content and the feature vector(s) of the detection model(s) to determine if there is a best match (e.g., the shortest distance) or a match over a threshold value. In one example, different classifiers may be trained and may be deployed that may detect the same theme, but within different types of inputs (e.g., text or audio). In one example, a classifier may have multi-modal inputs, e.g., audio features plus a text transcript may comprise predictors to a single multi-modal classifier.

In an illustrative example, users 180-184 may be participating in a network-based group communication session, e.g., a teleconference, a video conference, or the like via respective devices 110-114. In one example, the network-based group communication session is hosted by server(s) 116. Alternatively, the network-based group communication session may be hosted via another network-based platform or may be a peer-to-peer conversation, and may be accessed by server(s) 116. In one example one or more of the users 180-184 may opt-in to server(s) 116 "listening in" to their conversations/audio content from one or more of the participating devices 110-114. In other words, server(s) 116 may provide an off-topic detection service. In an example in which the server(s) 116 do not also host the network-based group communication session, such server(s) 116 may interconnect with a conference application (e.g., either on the network/server side and/or at the clients (e.g., one or more of devices 110-114)). For illustrative purposes, in the present example it may be assumed that server(s) 116 host the network-based group communication session and further provide an off-topic detection and alerting service.

In one example, server(s) 116 may retrieve user profiles (e.g., from DB(s) 118). In one example, users 180-184 may have different profiles for different contexts (e.g., a professional profile, a social profile, etc.), which may be activated depending upon the nature/context of the current network-based group communication session. In one example, server(s) 116 may poll devices 110-114 for additional devices that may be incorporated into the network-based group communication session ecosystem, such as a smart vehicle or smart home peripherals (e.g., additional microphones, displays, cameras, etc.). In one example, the user profiles may be adjustable and/or a user interface for the network-based group communication session may include a sensitivity setting, such as a "meter/knob" that may allow users 180-184 to adjust the level or degree of being off-topic that may be permitted before alerting, muting, and/or other remedial actions are imposed. In one example, an organizer/host may select settings and/or may have a profile with settings that may supersede that of other participants. Alternatively, or in addition, server(s) 116 may identify participants in the call (and the relationship between participants) and may adjust the sensitivity in response thereto.

In one example, server(s) 116 may also obtain, e.g., from an organizer/host, the topic(s) of the network-based group communication session. In one example, server(s) 116 may select to activate one or more detection models corresponding to the identified topic(s). Alternatively, or in addition, server(s) 116 may initially operate a plurality of detection models to identify the primary topic, or topics during the start of the network-based group communication session. In either case, when the topic(s) is/are identified, server(s) 116 may then monitor the audio content for one or more of the users 180-184 (or for all of the users). For instance, as noted above, audio features and/or text derived from the audio content may be used as inputs to one or more topic detection models to detect that either the relevant topics is/are present in the audio content, or that the relevant topics are not present in the audio content and/or that a different topics or topics is/are present in the audio content. In one example, the detection model(s) may further utilize supplemental data as predictors/inputs, such as image and/or video features as discussed above, facial expressions, etc. In one example, one or more auxiliary detection models (e.g., facial expression classifier models, or the like) may generate outputs that may be used as supplemental inputs to a topic detection model.

Alternatively, or in addition, an AI layer, which may comprise a rule-based module or another MLM may synthesize outputs from different topic detection or auxiliary MLMs to determine whether a user is off-topic and/or the degree of being off-topic. For instance, while server(s) 116 may fail to detect that a stated topic of the meeting is contained in the audio content, it may detect other topics that somewhat related to the stated topic. For instance, if the topic of the conversation is "baseball" and the topic of "basketball" is instead detected, server(s) 116 may determine that the audio content is only "slightly off-topic." On the other hand, if the topic of the conversation is "baseball" and the topic of "Thanksgiving" is instead detected, server(s) 116 may determine that the audio content is only "mostly off-topic." In one example, server(s) 116 may determine an objective measure of how far off-topic the audio content is, e.g., a measure or degree of being off-topic. For instance, the objective measure may be made in accordance with a language model (e.g., a large language model (LLM)) such as a number of hops in a language graph DB, a distance metric using word/sentence/document embeddings (doc2vec, etc.), or the like. Similarly, where the topic of the group communication session is cars, a user's speech/audio may seem to be off topic. However, video content may indicate that the user is continuing to demonstrate vehicle repair/troubleshoot (e.g., detected via one or more detection models that is trained and configured to classify such a topic using visual data). In one example, such knowledge may be used to weight the classification of a primary model that uses audio/text data, for instance.

In one example, when a user is off-topic, or the degree of being off-topic exceeds a threshold in accordance with a user profile, a host/organizer preference/setting, or the like, server(s) 116 may then implement one or more remedial actions. For instance, if a user is distracted and may be highly off topic (e.g., talking to a person who is not a participant in the network-based group conversation, etc.), the user may be muted (e.g., by disabling an audio feed from a respective one of the devices 110-114 to others of the devices 110-114 participating in the network-based group conversation). Alternatively, or in addition, server(s) 116 may present a notification to the off-topic user, such as a visual alert on a user interface presented via a display of a respective one of the devices 110-114. In one example, server(s) 116 may select one or more types of remedial actions (e.g., for a particular user (e.g., user 180, etc.), for the particular group, with respect to the specific circumstances (e.g., work, entertainment, leisure, etc.), and so forth).

In accordance with the present disclosure, the at least one remedial action may include presenting/transmitting a notification to one or more other users that a particular user is off-topic. For instance, a notification that the audio content of user 180 is off-topic may be presented to the entire group of users 180-184. For instance, a meeting organizer may have indicated that all users (including the organizer/host) be kept on-topic. Alternatively, or in addition, the network-based group communication session may be a classroom context, where a notification of an off-topic user may be presented to the host/organizer (e.g., a teacher), and so forth.

In one example, server(s) 116 may implement additional functionalities, such as detecting background noise and filtering out the sound of a dog barking, etc., detecting and visually filtering inappropriate gestures, applying additional AI/ML models to anticipate a user's next movements and to predict when the user may become distracted, e.g., to determine whether a camera should switch off (e.g., the user steps away from the camera, has a side-bar conversation with a colleague, looks away, etc.), and so forth. It should be noted that in accordance with the present disclosure, pet noises may be indicative of an off-topic user. However, expletives are not off-topic. Rather, expletives may be considered as merely an emphatic way of expressing views about a particular topic. In other words, examples of the present disclosure do not implement a censoring system of this nature. In other words, the present disclosure primarily focuses on the topics of the communications and not in the "mannerism" of the participants (e.g., civility, courtesy, grace, etc.).

In still another example, server(s) 116 may detect a distracted user and may apply a filter such that other users may perceive the subject user to still be facing the camera, may use a generative AI/ML model of the user, etc. In one example, server(s) 116 may further implement one or more detection models that is/are configured/trained to detect when a user is expected to be speaking/responding (e.g., when the user is specifically addressed for a question, for instance "what do you think John?"), and to alert the user by presenting a designated indicator via a user interface/display, presenting an audible alert, etc.

In one example, server(s) 116 may alternatively or additionally unmute a user who is determined to be directly addressed or who is otherwise expected to be speaking. In one example, server(s) 116 may visually "remind" a user, or users, if filters are on, whether users have been automatically muted or unmuted, etc. In one example, server(s) 116 may communicate through different modalities to ensure that a user is aware and has the ability to switch back, unmute, etc., such as presenting a visual alert and/or an audible alert (e.g., via an ear-piece, or the like that is not presented to other users), etc. In one example, server(s) 116 may continue to monitor the audio content of any or all of users 180-184 to detect when an off-topic user is back "on-topic," and may unmute, restore a video feed, etc. For instance, user 180 may be detected to be having an off-topic side conversation and may be automatically muted. User 180 may continue to have the side conversation for a time, but may then be detected to be quiet and facing the camera again. After a period of time, server(s) 116 may then allow audio and/or video of user 180 to be conveyed the other users 181-184 via respective devices 111-114.

In one example, server(s) 116 may implement an additional AI/ML service to learn from each interaction and adjust user profiles (e.g., sensitivities, remedial actions, etc.) accordingly. In one example, a user profile may comprise a user preference model that may be trained to output recommended sensitivity thresholds and/or remedial actions accordingly to a time of day, day of the week, month or season, the other participants or types of participants in a network-based group communication session, the user's location (e.g., at work, at home, outdoors, traveling), the setting (e.g., public setting or private setting), etc. In one example, the AI/ML service may continue to build profiles and data models for various users such that each interaction creates a more robust experience. Similarly, the AI/ML service may learn appropriate contexts to communicate specific types of status to specific audiences, and so forth. In addition, server(s) 116 may perform various additional operations as described in connection with the examples of FIGS. 2 and 3, or elsewhere herein.

It should again be noted that any number of server(s) 116 or database(s) 118 may be deployed in the system 100. In one example, network 102 may also include an application server (AS) 104 and a database (DB) 106. In one example, AS 104 may perform the same or similar functions as server(s) 116. Similarly, DB 106 may store the same or similar information as DB(s) 118 (e.g., a user profile database, a topic detection model database/repository, etc.). For instance, network 102 may provide a service to video and/or audio conferencing platforms and/or to subscribing user devices in connection with a network-based group communication session management service, e.g., in addition to video, phone, and/or other telecommunication services. In one example, AS 104, DB 106, server(s) 116, DB(s) 118, and/or any one or more of the devices 110-114, may operate in a distributed and/or coordinated manner to perform various steps, functions, and/or operations described herein.

Similarly, it should again be noted that some or all of the functions described above in connection with server(s) 116 may alternatively or additionally be deployed in a user endpoint device or app thereof. For instance, a conferencing app or a secondary app that operates in conjunction with a conferencing app may monitor audio content (and in one example video/visual content) of a user to detect when the audio content of the user is on-topic or off-topic. In one example, due to limited endpoint device capability for running AI/ML models of the at least one detection model may be limited to detecting the identified topic or topics of the communication session. In other words, the use of additional detection models to specifically detect other topics may be omitted, e.g., off-topic audio content may be inferred when the audio content is determined to not include the communication session topics according to the detection model(s) for such topic(s).

It should be further noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. Similarly, although only two access networks 120 and 122 are shown, in other examples, access networks 120 and/or 122 may each comprise a plurality of different access networks that may interface with network 102 independently or in a chained manner. For example, device 113, device 114, and/or server(s) 116 may be in communication with network 102 via different access networks, and so forth. Thus, these and other modifications are all contemplated within the scope of the present disclosure.

Figure 2:
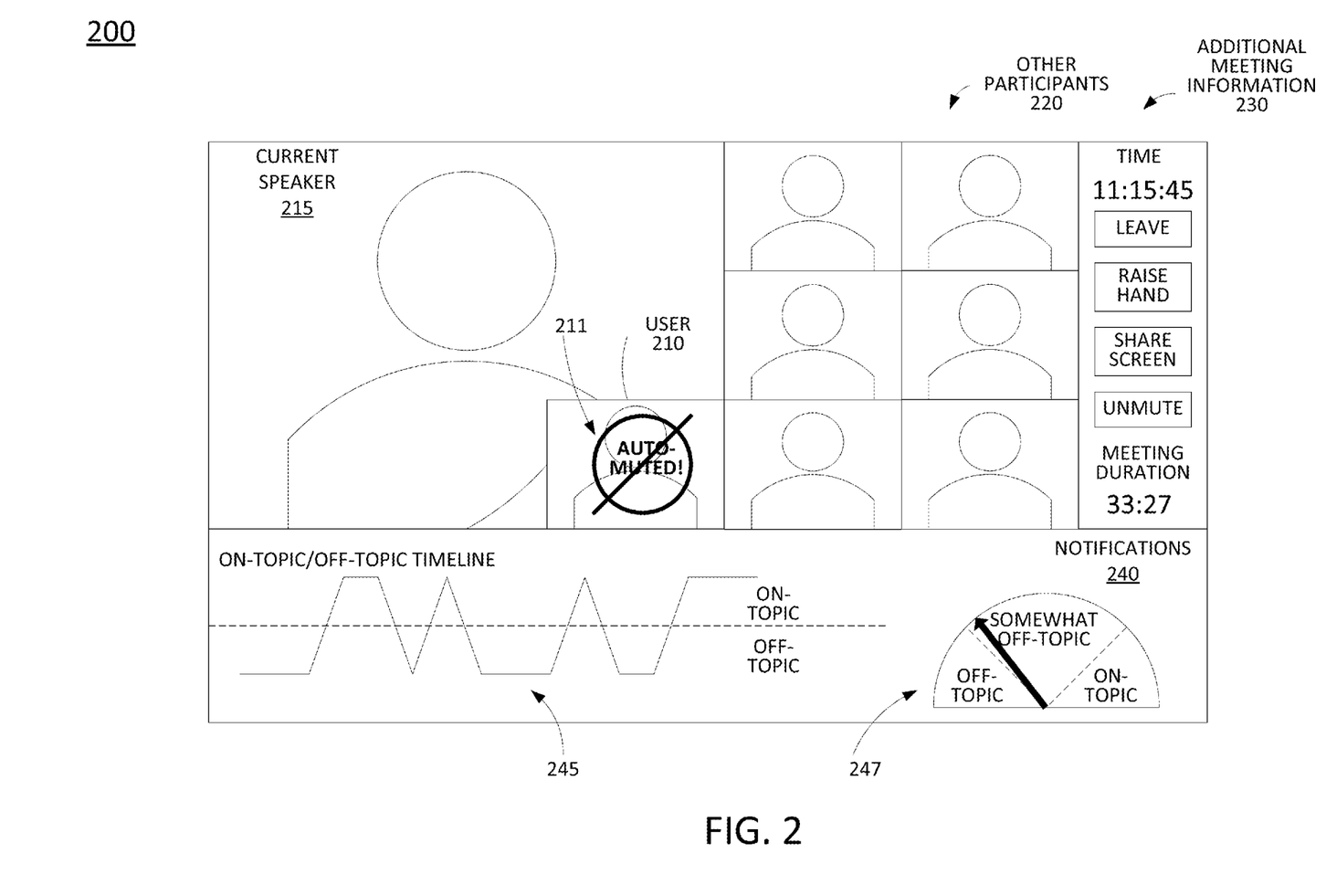
FIG. 2 illustrates an example user interface for a network-based group communication session, in accordance with the present disclosure.

To further aid in understanding the present disclosure, FIG. 2 illustrates an example user interface 200 of a network-based/video conferencing application, in accordance with the present disclosure. For instance, the user interface 200 may be presented on an endpoint device of a user 210 who is a participant in a video or audio only conference/online meeting. In the present view, an image/video/avatar of a current speaker 215 may be presented in a larger representation in the user interface 200, while a smaller inset showing an image/video (or avatar, etc.) of user 210 may be as shown in the figure. Video/images/avatars of other participants 220 may be shown in a gallery view. Additional meeting information 230 may occupy space on the right side of user interface 200 and may show a current time, a meeting duration, and several selectable buttons to "leave," "raise hand," "share screen," and "unmute" (e.g., where if the unmute button is selected, the user 210 may be unmuted and the button may change to a "mute" button, which when selected may re-mute the user 210). In the present example, audio content of user 210 may be detected to be off-topic by a network-based conference server, an endpoint device or network-based digital assistant, or the like, in response to which the user 210 may be automatically muted (as indicated by the overlay 211 over the image/video/avatar of user 210). In addition to presenting a notification to the user 210 of auto-muting, the user interface 200 may include a notification area 240, which may include a meter 247 indicating a degree to which the audio content of the user 210 is detected to be off-topic. In addition, the notification area 240 may further include an on-topic/off-topic timeline 245, which may indicate whether the meeting and/or the user 210 has predominantly stayed on-topic or off-topic throughout the meeting. In this regard, it should be noted that in one example, the timeline 245 may pertain only to the user 210, while in another example, the timeline 245 may pertain to all of the participants having audio content that can be detected and determined to be on-topic or off-topic (and in one example a degree of being off-topic). For instance, the timeline 245 may represent the average of all participants at any given time. In one example, non-speaking users may be considered to be on-topic. Likewise, an active speaker who is adhering to the designated topic(s) of the meeting may be considered to be on-topic. In one example, non-speaking users who are determined to be distracted (e.g., from visual data) may be considered to be somewhat off-topic (e.g., neutral between on-topic and off-topic indicated by the dotted line though the timeline 245 (which may also correspond to a vertical pointer in the meter 247)).

It should be noted that FIG. 2 and the above description represent just one example of a user interface 200 that may be implemented in accordance with the present disclosure. Thus, other, further, and different examples may have more or less features, or different features from that which is illustrated in FIG. 2. For instance, in another example, portions of the meeting may be irrelevant to some participants, such as user 210, who may multi-task while other topics are discussed, and who may return to paying closer attention to the meeting when the discussion returns to topic(s) relevant to the user 210. In this case, the meter 247 may display whether current speaker 215 is on-topic or off-topic (e.g., with respect to one or more topics designated by user 210 as being relevant to the user 210). In the instant in time recorded in the example of FIG. 2, the current speaker 215 may be on another topic such that the arrow of the meter 247 points to "somewhat off topic" (and close to the edge of the "off-topic" category). In this case, user 210 may be auto-muted. However, when the speaker changes or the current speaker 215 returns to a relevant topic, the arrow of the meter 247 may change to indicate "on-topic" and/or the user 210 may be unmuted, etc. Still other examples may include different views of other participants 220, the imagery of user 210 may be blurred, a video feed disabled, or the like, when user 210 is detected to be off-topic, and so forth. Thus, these and other modifications are all contemplated within the scope of the present disclosure.

Figure 3:
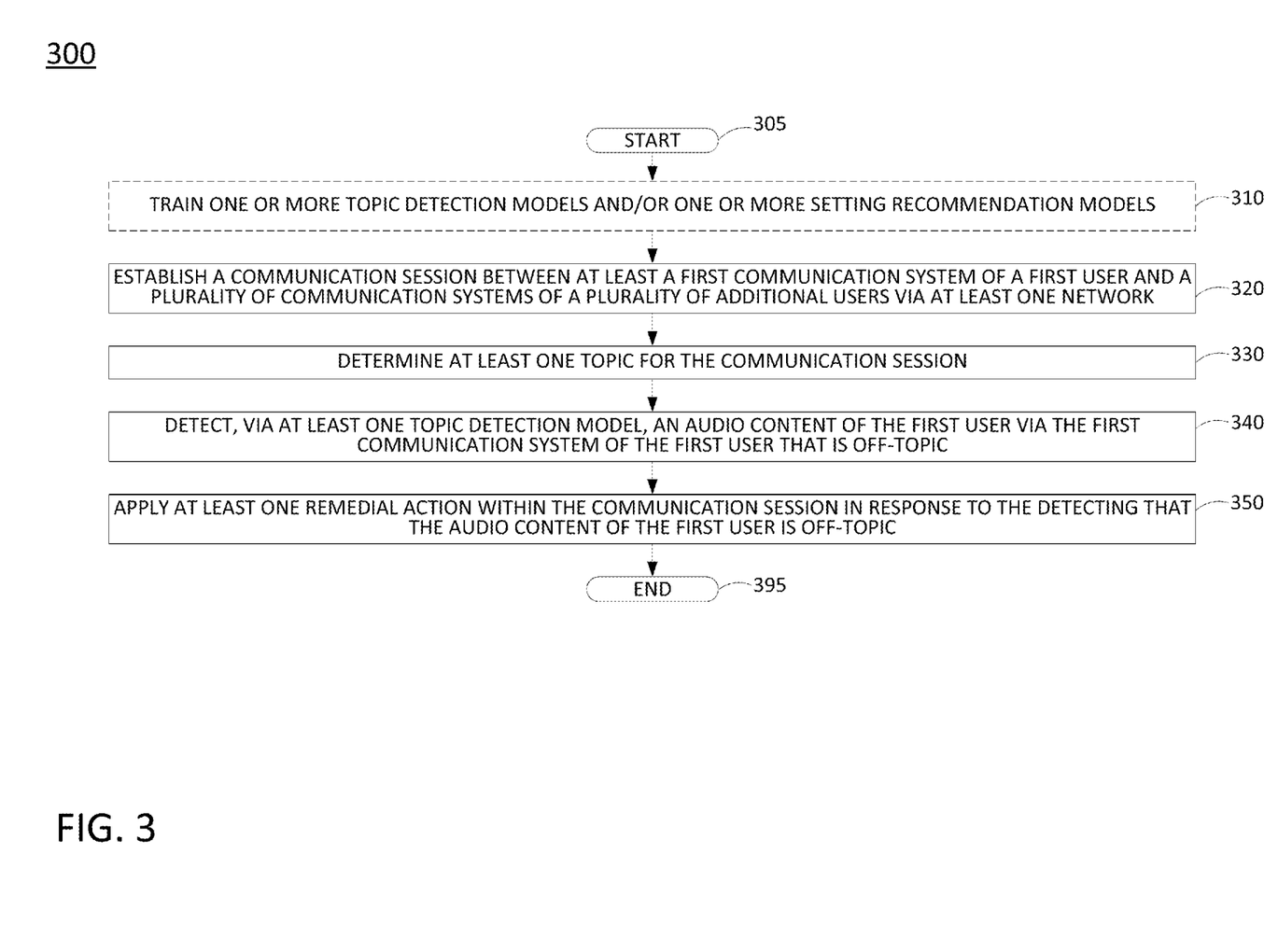
FIG. 3 illustrates a flowchart of an example method for applying at least one remedial action within a communication session via at least one network in response to detecting via at least one detection model that the audio content of a first user is off-topic, in accordance with the present disclosure.

FIG. 3 illustrates a flowchart of an example method 300 for applying at least one remedial action within a communication session via at least one network in response to detecting via at least one detection model that the audio content of a first user is off-topic. In one example, the method 300 is performed by a component of the system 100 of FIG. 1, such as by one of the servers 116, application server 104, and/or any one or more components thereof (e.g., a processor, or processors, performing operations stored in and loaded from a memory), or by one of the servers 116 or application server 104, in conjunction with one or more other devices, such as DB 106, DB 118, any one or more of devices 110-114, and so forth. In another example, the method 300 may be performed by an endpoint device, such as one of the devices 110-114 of FIG. 1, or one of the devices 110-114 in conjunction with one or more other devices or systems, such as a different one of the devices 110-114, server(s) 116, AS 104, etc. In one example, the steps, functions, or operations of method 300 may be performed by a computing device or system 400, and/or processor 402 as described in connection with FIG. 4 below. For instance, the computing device or system 400 may represent any one or more components of a server 116, an application server 104, one of the endpoint devices 110-114, etc. in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may train one or more topic detection models and/or one or more setting recommendation models. For instance, the topic detection models may comprise machine learning models (MLMs) trained in accordance with a training data set comprising a plurality of audio samples, where each of the plurality of audio samples is labeled with at least one topic. Alternatively, or in addition, the MLM(s) may be trained with text-format training data (which in one example may comprise text that is generated from audio samples via a speech-to-text conversion process). In other words, at least one of the MLMs/detection models may be trained on the audio directly, or a combination of audio and converted text. For instance, the tonality and/or other non-semantic audio features can help to indicate whether the user is adhering to a business topic or has become more conversational and seems to be off topic. However, another MLM may be trained on converted text samples, while non-semantic audio features may be omitted (and/or used as inputs for a different MLM to detect user demeanor, or the like, which may subsequently be used as an input to a topic detection model and/or an AI/ML layer to determine a degree/measure of being off-topic).

In one example, the training data set may further comprise a plurality of visual samples associated with the plurality of audio samples, where each of the plurality of visual samples may be labeled with a respective user attention level. For instance, the at least one MLM may comprise at least two MLMs, where a first MLM may be trained to detect user attention levels from input visual samples, and wherein the user attention levels may comprise an auxiliary input to at least a second MLM that is trained to detect at least one topic (e.g., the at least one topic that may be identified at step 330). For instance, the confidence that the user is on-topic or off-topic may be enhanced or diminished depending upon whether it appears the user is paying attention or appears distracted based on the visual data. Still another MLM may be trained with respect to visual data (e.g., where a user discussing "cars" may be more likely to be considered "on-topic" when a visual feed appears to show the user physically interacting with a car).

At step 320, the processing system establishes a communication session between at least a first communication system of a first user and a plurality of communication systems of a plurality of additional users via at least one network (e.g., participants in the communication session). For instance, as noted above, the processing system may alternatively comprise: a network-based processing system that hosts the communication session, a network-based processing system that is different from a hosting system of the communication session, or the first communication system of the first user (e.g., an endpoint device of the first user may comprise a virtual assistant, a conferencing app, a conferencing app add-on, or the like may perform steps of the method 300).

At step 330, the processing system determines at least one topic for the communication session. For instance, in one example, the at least one topic may be identified by the first user and/or one or more of the additional users. Alternatively, or in addition, the at least one topic may be determined via at least one topic detection model. For instance, the processing system may initially operate a plurality of detection models to identify the primary topic, or topics during the start of the communication session. In one example, audio data (and in one example audio plus image data) from the first two minutes of the communication session may be used, the first five minutes, etc. In one example, the detection model may comprise an MLM that may be trained by the processing system at step 310, or which may be otherwise obtained and implemented by the processing system. Alternatively, the meeting invite itself may define a topic such as "budget meeting," "new personnel hiring meeting," "client development meeting," "staff performance meeting," etc.

At step 340, the processing system detects, via at least one topic detection model, an audio content of the first user via the first communication system of the first user that is off-topic. As noted above in connection with optional step 310, the at least one topic detection model may comprise at least one machine learning model (MLM) that is trained to detect at least one of: the at least one topic, or one or more topics different from the at least one topic. As also noted above, the at least one detection model (e.g., at least one MLM) may be trained by the processing system at step 310 or may be otherwise acquired and implemented by the processing system for use in step 330 and/or step 340. In one example, an output of the at least one MLM may comprise an indication of whether an input audio sample includes the at least one topic. Alternatively, or in addition, the audio content of the first user may be determined to be off-topic when the audio content of the first user is determined to include a topic that is different from the at least one topic for the communication session. In addition, in one example, an output of the at least one MLM may further include a measure of adherence to the at least one topic based upon at least the audio content of the first user. For instance, the processing system may determine an objective measure of how far off-topic the audio content is, e.g., a measure or degree of being off-topic. For instance, the objective measure may be made in accordance with a language model, a distance metric using word/sentence/document embeddings (doc2vec, etc.), or the like.

In one example, step 340 may include converting the audio content of the first user to a text sample, where the at least one MLM is configured to detect at least one of: the at least one topic, or the one or more topics different from the at least one topic, in accordance with the text sample as an input to the at least one MLM. In one example, the at least one MLM may be trained on and may process the audio directly, or a combination of audio and converted text. For instance, the tonality and/or other non-semantic audio features can help to indicate whether the user is adhering to a business topic or has become more conversational and seems to be off-topic. In one example, step 340 may further include inputting additional non-audio features to the at least one MLM (such as an MLM that may be trained with respect to visual data as auxiliary input(s), or an MLM that is trained to detect posture, whether the user is facing the camera, specific facial expressions/demeanor, gestures or actions, and so forth). For instance, a detection of "cutting food items on a cutting board" would appear to indicate the user is multi-tasking and may be off-topic. In addition, in one example, the confidence that the user is on-topic or off-topic and/or the metric/degree of being off-topic may be enhanced or diminished depending upon whether it appears the user is paying attention or appears distracted (e.g., based upon the outputs of one or more additional MLMs that may process visual data).

At step 350, the processing system applies at least one remedial action within the communication session in response to the detecting that the audio content of the first user is off-topic. For instance, in one example, step 350 may include presenting a notification to the first user at the first communication system of the first user that the audio content of the first user is detected to be off-topic. In one example, the notification may include an indication of a degree that the audio content of the first user is detected to be off topic (e.g., based upon topic similarity or the like as discussed above). In one example, the at least one remedial action may include presenting an additional notification to at least one of the plurality of communication systems of at least one of the plurality of additional users that the audio content of the first user is detected to be off-topic. In one example, a current speaker, teacher, host, organizer, or the like may be provided with an aggregate metric indicating a level of engagement with the other users, e.g., a measure of whether the other users are generally on-topic or off-topic. Alternatively, or in addition, step 350 may include generating a modified audio content from the audio content of the first user that is off-topic (e.g., in response to the detecting that the audio content of the first user is off-topic) and transmitting the modified audio content to the plurality of communication systems of the plurality of additional users. For instance, the modified audio content may comprise a muted voice of the user or an entire muting of an audio track. Alternatively, the processing system may omit transmission of any audio of the first user from the first communication session to any of the other communication systems of other users. In one example, the at least one remedial action may include presenting a visualization of the detection that the audio content of the first user is off-topic (and/or of a degree to which it is determined to be off topic). In one example, the at least one remedial action may be selected from among a plurality of available remedial actions in accordance with a user profile of the first user.

In one example, the first user may be enabled to adjust a sensitivity of an off-topic meter, e.g., depending on the type of communication session/meeting, or based on other user preferences. For instance, a user profile may specify to implement automatic muting of the first user when the audio content is "somewhat off-topic," "highly off-topic," or for a specified length of time being off-topic (e.g., allowing a speaker to be off-topic for 15, 20, or 30 seconds before automatic muting is applied), etc. In one example, the at least one remedial action is selected based upon a context of the communication session. For instance, the threshold(s) for implementing automatic muting may vary based on the context. To further illustrate, the context may include whether the communication session is for business purposes, is for a school/educational/training setting, is for leisure purposes, etc. In accordance with the present disclosure, context may also include time of day, day of week, etc., the number of participants, whether the first user or any of the additional users are in a public or private setting (which can be detected from audio and/or visual content at the start of the communication session and/or which can be indicated by user input(s) in connection with the communication session), the identities of particular users and/or the relationship(s) between users (e.g., clients, supervisors, students), past history of communication sessions among the same users or a substantially overlapping group of users, and so forth.

In one example, the selection of the at least one remedial action may be in accordance with an additional AI model or MLM. In one example, the at least one remedial action may also be selected based on available hardware or capability of the first communication system (or additional users' communication systems). For example, a haptic feedback may be provided if a user has a smartwatch that includes haptic capability. Similarly, an AR visual marker may be provided if the first user is participating via an AR device (e.g., the first communication system may comprise an AR device). In another example, the user may be using an earpiece or headset such that audio feedback can be presented to the first user that the first user is off-topic, e.g., where it will not be heard by the additional users when picked up by the first user's microphone. Following step 350, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300 on an ongoing basis as the communication session progresses, for other users who are participants in the same communication session, for additional communication sessions, and so on. In another example, the method 300 may be expanded to include tracking an effectiveness of a remedial action and/or user preferences for the implementation of a remedial action. For instance, in an example in which the processing system selects the remedial action(s), the user may indicate whether the user finds the action(s) helpful or not, to inform which remedial action(s) may be selected in future instances for the same user and/or for other users. In one example, the method 300 may include overriding a user profile of the first user, e.g., based upon a user profile and/or preferences that may be set by an organizer/host of the communication session. In still another example, the method 300 may include detecting additional context, and muting and/or unmuting for such detected contexts, such as unmuting a user when the user is directly addressed, muting when a user is perceived to have finished answering a question or speaking, unmuting a plurality of users when collective group audio is expected (e.g., laughter in response to a presenter joke, such as for an online conference-based comedy or entertainment event), and so forth. In one example, the method 300 may include training one or more detection models (e.g., MLM(s)) to detect completion of a joke, to detect a direct address of a user, to detect when a user has finished speaking in response to a direct address, and so forth. In one example, the method 300 may be expanded or modified to include steps, functions, and/or operations, or other features described above in connection with the example(s) of FIGS. 1 and 2, or as described elsewhere herein. It should be noted that this monitoring service is only implemented with the consent of the users. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components, devices, and/or systems illustrated in FIG. 1 or described in connection with FIGS. 2 and 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for applying at least one remedial action within a communication session via at least one network in response to detecting via at least one detection model that the audio content of a first user is off-topic, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented.

The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for applying at least one remedial action within a communication session via at least one network in response to detecting via at least one detection model that the audio content of a first user is off-topic (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for applying at least one remedial action within a communication session via at least one network in response to detecting via at least one detection model that the audio content of a first user is off-topic (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
    establishing by a processing system including at least one processor, a communication session between at least a first communication system of a first user and a plurality of communication systems of a plurality of additional users via at least one network;
    determining, by the processing system, at least one topic for the communication session;
    detecting, by the processing system via at least one topic detection model, an audio content of the first user via the first communication system of the first user that is off-topic, wherein an output of the at least one topic detection model includes a measure of adherence to the at least one topic based upon the audio content of the first user; and
    applying, by the processing system, at least one remedial action within the communication session in response to the detecting that the audio content of the first user is off-topic, wherein the at least one remedial action comprises presenting, by the processing system, a notification to the first user at the first communication system of the first user that the audio content of the first user is detected to be off-topic, wherein the notification includes an indication of a degree that the audio content of the first user is detected to be off topic, and wherein the indication of the degree that the audio content of the first user is detected to be off topic is based on the measure of adherence.

2. The method of claim 1, wherein the at least one topic is identified by at least one of: the first user or at least one of the plurality of additional users.

3. The method of claim 1, wherein the at least one topic for the communication session is determined via the at least one topic detection model.

4. The method of claim 1, wherein the at least one topic detection model comprises at least one machine learning model that is trained to detect at least one of:
    the at least one topic; or
    one or more topics different from the at least one topic.

5. The method of claim 4, wherein an output of the at least one machine learning model comprises an indication of whether an input audio sample includes the at least one topic.

6. The method of claim 4, wherein the detecting includes converting the audio content of the first user to a text sample, wherein the at least one machine learning model is configured to detect at least one of: the at least one topic or the one or more topics different from the at least one topic, in accordance with the text sample as an input to the at least one machine learning model.

7. The method of claim 4, wherein the at least one machine learning model is trained in accordance with a training data set comprising a plurality of audio samples, wherein each of the plurality of audio samples is labeled with at least one topic.

8. The method of claim 7, wherein the training data set further comprises a plurality of visual samples of a plurality of communication sessions associated with the plurality of audio samples, wherein each of the plurality of visual samples is labeled with a respective user attention level.

9. The method of claim 7, wherein the at least one machine learning model comprises at least two machine learning models, wherein a first machine learning model of the at least two machine learning models is trained to detect user attention levels from input visual samples of the communication session, and wherein the user attention levels comprise an auxiliary input to at least a second machine learning model of the at least two machine learning models comprising the at least one machine learning model that is trained to detect the at least one topic.

10. The method of claim 1, wherein the audio content of the first user that is off-topic is determined to be off-topic when the audio content of the first user that is off-topic is determined to include a topic that is different from the at least one topic for the communication session.

11. The method of claim 1, wherein the processing system comprises:
    a network-based processing system that hosts the communication session;
    a network-based processing system that is different from a hosting system of the communication session; or
    the first communication system of the first user.

12. The method of claim 1, wherein the at least one remedial action further comprises:
    generating, by the processing system, a modified audio content from the audio content of the first user that is off-topic, in response to the detecting that the audio content of the first user is off-topic; and
    transmitting, by the processing system, the modified audio content to the plurality of communication systems of the plurality of additional users.

13. The method of claim 1, where the at least one remedial action further comprises:
    presenting, by the processing system, an additional notification to at least one of the plurality of communication systems of at least one of the plurality of additional users that the audio content of the first user is detected to be off-topic.

14. The method of claim 1, wherein the at least one remedial action is selected from among a plurality of available remedial actions in accordance with a user profile of the first user.

15. The method of claim 1, wherein the at least one remedial action is selected based upon a context of the communication session.

16. A non-transitory computer-readable medium storing instructions which, when executed by a processing system including at least one processor, cause the processing system to perform operations, the operations comprising:
 establishing a communication session between at least a first communication system of a first user and a plurality of communication systems of a plurality of additional users via at least one network;
 determining at least one topic for the communication session;
 detecting, via at least one topic detection model, an audio content of the first user via the first communication system of the first user that is off-topic, wherein an output of the at least one topic detection model includes a measure of adherence to the at least one topic based upon the audio content of the first user; and
 applying at least one remedial action within the communication session in response to the detecting that the audio content of the first user is off-topic, wherein the at least one remedial action comprises presenting, by the processing system, a notification to the first user at the first communication system of the first user that the audio content of the first user is detected to be off-topic, wherein the notification includes an indication of a degree that the audio content of the first user is detected to be off topic, and wherein the indication of the degree that the audio content of the first user is detected to be off topic is based on the measure of adherence.

17. An apparatus comprising:
a processing system including at least one processor; and
a computer-readable medium storing instructions which, when executed by the processing system, cause the processing system to perform operations, the operations comprising:
 establishing a communication session between at least a first communication system of a first user and a plurality of communication systems of a plurality of additional users via at least one network;
 determining at least one topic for the communication session;
 detecting, via at least one topic detection model, an audio content of the first user via the first communication system of the first user that is off-topic, wherein an output of the at least one topic detection model includes a measure of adherence to the at least one topic based upon the audio content of the first user; and
 applying at least one remedial action within the communication session in response to the detecting that the audio content of the first user is off-topic, wherein the at least one remedial action comprises presenting, by the processing system, a notification to the first user at the first communication system of the first user that the audio content of the first user is detected to be off-topic, wherein the notification includes an indication of a degree that the audio content of the first user is detected to be off topic, and wherein the indication of the degree that the audio content of the first user is detected to be off topic is based on the measure of adherence.

18. The apparatus of claim 17, wherein the at least one topic is identified by at least one of: the first user or at least one of the plurality of additional users.

19. The apparatus of claim 17, wherein the at least one topic for the communication session is determined via the at least one topic detection model.

20. The apparatus of claim 17, wherein the at least one topic detection model comprises at least one machine learning model that is trained to detect at least one of:
 the at least one topic; or
 one or more topics different from the at least one topic.

* * * * *